United States Patent
Makhlouf et al.

(10) Patent No.: US 7,233,633 B2
(45) Date of Patent: Jun. 19, 2007

(54) CHANNEL ESTIMATION USING LINEARLY CONSTRAINED FILTER COEFFICIENTS

(75) Inventors: Isam R. Makhlouf, Lake Zurich, IL (US); Steven C. Jasper, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 233 days.

(21) Appl. No.: 11/098,218

(22) Filed: Apr. 4, 2005

(65) Prior Publication Data

US 2006/0222094 A1    Oct. 5, 2006

(51) Int. Cl.
*H04L 27/06* (2006.01)
*H04B 1/10* (2006.01)

(52) U.S. Cl. .................................. 375/340; 375/350
(58) Field of Classification Search ............... 375/260, 375/261, 264, 340, 350
See application file for complete search history.

(56) References Cited

U.S. PATENT DOCUMENTS

| 6,765,969 | B1* | 7/2004 | Vook et al. ............... 375/259 |
| 2004/0248541 | A1* | 12/2004 | Park .......................... 455/306 |
| 2004/0264561 | A1* | 12/2004 | Alexander et al. .......... 375/232 |
| 2005/0135324 | A1* | 6/2005 | Kim et al. ................... 370/343 |

* cited by examiner

*Primary Examiner*—Don N. Vo
(74) *Attorney, Agent, or Firm*—Valerie M. Davis (57) ABSTRACT

A system that includes a receiver (100) that is configured for: selecting (210) a set of demodulator output samples and a corresponding set of reference symbols each having a magnitude; generating (220) a set of raw channel estimates based on the set of demodulator output samples and the corresponding set of reference symbols; determining (230) a set of linearly-constrained filter coefficient parameters; and combining (240) the set of raw channel estimates with the set of linearly-constrained filter coefficient parameters to generate a channel estimate.

20 Claims, 7 Drawing Sheets

CHANNEL ESTIMATION USING LINEARLY CONSTRAINED FILTER COEFFICIENTS

CROSS-REFERENCE TO RELATED APPLICATIONS

The present application is related to the following U.S. application commonly owned together with this application by Motorola, Inc.:

Ser. No. 11,098,208, filed Apr. 4, 2005, titled "Method and Apparatus for Reference Symbol Aided Channel Estimation" by Jasper, et al.

FIELD OF THE INVENTION

The present invention relates generally to decision-directed channel estimation in a receiver apparatus.

BACKGROUND OF THE INVENTION

Pilot symbol aided Minimum Mean-Squared Error (MMSE) channel estimation (which uses only pre-determined or known symbols, commonly referred to in the art as pilot and preamble symbols, in deriving channel estimates) is a well-known method of obtaining channel gain information for symbol decoding in single or multi-carrier systems. For example, the pilot symbol aided MMSE channel estimation method is used in Orthogonal Frequency Division Multiplexing (OFDM) systems such as those that operate in accordance with the Institute of Electrical and Electronics Engineers (IEEE) 802.11a and 802.11g standards.

In some systems, pilot symbol placement and density is designed to enable adequate pilot symbol aided MMSE channel estimation only for low speed applications, for example applications at pedestrian speeds. However, when such systems are operated at higher speeds, a strictly pilot symbol aided channel estimation methodology often proves inadequate. To improve channel estimation for such systems at higher speeds, a decision directed MMSE channel estimation approach may be used. This decision directed approach is also referred to herein as reference symbol aided channel estimation to cover the potential use of both pre-determined as well as regenerated symbols in the channel estimation process. The regenerated reference symbols are typically but not necessarily data symbols.

To implement the reference symbol aided MMSE channel estimation approach using pilot and regenerated data symbols, a receiver in an OFDM system generally includes a MMSE predictive channel estimator to extrapolate the channel gain at a given data symbol location or instant. The MMSE estimator is essentially a linear filter that produces smoothed or predicted channel estimates from a set of "raw" or instantaneous estimates typically at nearby (in the time or frequency sense) symbols. The estimator combines these raw channel estimates with filter coefficients selected from a corresponding set of filter coefficients to predict the channel estimate for the given data symbol.

A set of coefficients can be pre-computed for each data symbol instant and stored in a look-up table. For symmetric delay/Doppler profiles the coefficients are real-valued, providing computational and memory savings. As an improvement, several banks of coefficients pertaining to different channel conditions (e.g., fading rate, signal-to-noise ratio (SNR), etc.) can be provided and the best selected adaptively.

For multi-level constellation systems (e.g., 16 or 64 Quadrature Amplitude Modulation (QAM)), the noise variances of the instantaneous channel estimates depend on the magnitudes of the modulated symbols. To optimize performance in this case, the filter coefficients should ideally be designed as functions of the symbol magnitudes. However, this can lead to a prohibitively large memory requirement. For an N-tap estimator, the number of coefficient sets is equal to $M^N$, where M is the number of symbol magnitudes (e.g., M=3 for 16QAM, and M=9 for 64QAM). For example, a ten tap estimator in a receiver using 64QAM would require $9^{10}$ different sets of coefficients.

One known method for minimizing coefficient memory is to assume equal symbol magnitude in computing estimator coefficients. However, this approach results in sub-optimal performance for receivers using 16QAM or 64QAM due to what is commonly referred to in the art as "noise enhancement." In forming the raw channel estimates, noise is enhanced whenever a symbol's squared magnitude is less than the average. For instance, the raw channel estimate for a symbol i is given by $g_i = v_i/p_i = (p_i h_i + n_i)/p_i = h_i + (n_i/p_i)$, where v is the receiver's demodulator output, p is the symbol value, h is the channel gain and n is the noise. As can be seen, for small magnitudes the effective noise term $n_i/p_i$ is magnified. Typically, the average noise enhancement is about 2.8 dB for 16QAM and about 4.3 dB for 64QAM.

Thus, there exists a need for a channel estimation method and apparatus that gives improved performance for multi-level constellations without necessitating an impractical amount of memory. It is also desirable that the channel estimation method and apparatus operate with reduced computational complexity, for both multi-level and non-multi-level constellations. It is further desirable that the channel estimation method and apparatus enable higher-speed operation of systems with pilot symbol aided MMSE channel estimation.

BRIEF DESCRIPTION OF THE FIGURES

A preferred embodiment of the invention is now described, by way of example only, with reference to the accompanying figures in which.

DETAILED DESCRIPTION OF THE INVENTION

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

Generally speaking pursuant to the various embodiments of the present invention, apparatus and a method for channel estimation is described that enables high-speed operation of systems with pilot symbol aided MMSE channel estimation, wherein coefficient memory and computational complexity is reduced while providing for greatly improved performance over known methods. Those skilled in the art will realize that the above recognized advantages and other advantages described herein are merely exemplary and are not meant to be a complete rendering of all of the advantages of the various embodiments of the present invention.

Figure 1:
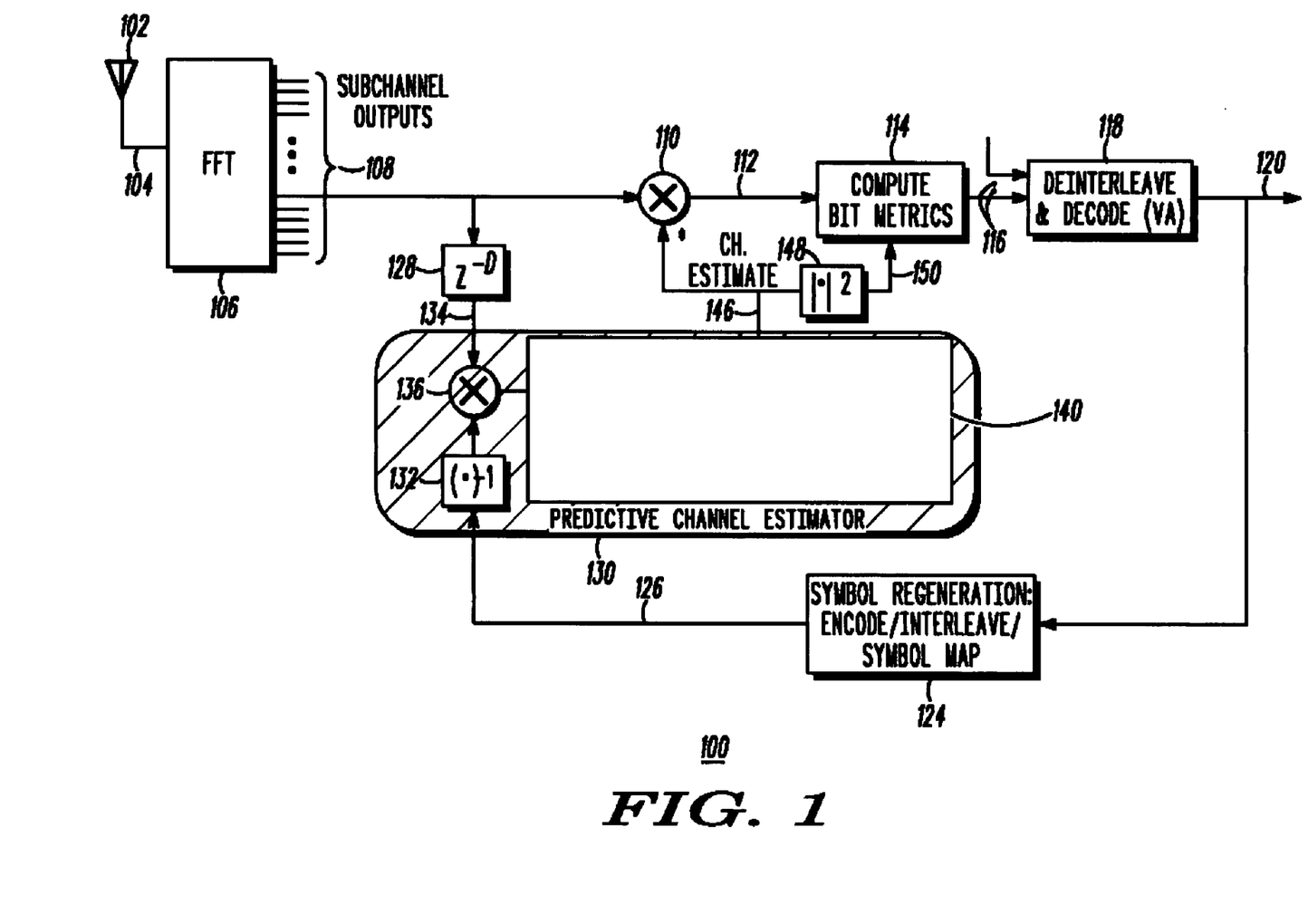
FIG. 1 illustrates a receiver that includes a channel estimator that operates in accordance with embodiments of the present invention.

Referring now to the drawings, and in particular FIG. 1, a receiver is shown and indicated generally at 100, which implements a decision directed channel estimation method and apparatus in accordance with embodiments of the present invention. Those skilled in the art will recognize and appreciate that the specifics of this illustrative example are not specifics of the invention itself and that the teachings set forth herein are applicable in a variety of alternative settings. Receiver 100 may be, for instance, included in an OFDM system (i.e., an OFDM receiver) that operates in the 4.9 GHz frequency spectrum, or any other suitable frequency spectrum, in accordance with the IEEE 802.11a or 802.11g standards. Moreover, receiver 100 may be configured to implement various modulation techniques such as, for instance, 16QAM, 64QAM, Phase Shift keying (PSK), etc. In order to show a practical example of these various teachings, receiver 100 is described as an OFDM receiver. However, it should be readily appreciated by one skilled in the art that this illustration is not meant to limit the present invention to OFDM systems, and it is contemplated that various embodiments of the present invention may be implemented in other types of systems.

More specifically, in accordance with the embodiment illustrated in FIG. 1 receiver 100 ideally comprises: one or more antenna elements 102, a demodulation/demodulator apparatus 106 (for example one that implements a Fast Fourier Transform (FFT) operation), a multiplier 110, a bit metrics computer 114, a deinterleaver and decoder 118 that is preferably viterbi algorithm-based, a symbol regenerator 124, a delay element 128 that is typically pre-determined depending on the receiver implementation, and a magnitude squaring operator 148. Conventional apparatus well known in the art, for example, may be used to implement the above elements of receiver 100.

Receiver 100 further includes a channel estimator (ideally an MMSE estimator) 130 in accordance with the various teachings of the present invention. Estimator 130 may be implemented as a suitable processor device that is programmed to execute a set of instructions in accordance with embodiments of the present invention that is stored in a suitable memory (not shown) that may be accessed by receiver 100. Estimator 130 may alternatively be implemented in suitable hardware. Also typically included in receiver 100 but not shown for the sake of clarity in illustrating the embodiments of the present invention is conventional and suitable receiver circuitry, as is well known in the art, between the antenna(s) 102 and the demodulator 106 for performing all required filtering and down-conversion operations needed to obtain a time-domain digital baseband signal 104.

In operation, a radio frequency (RF) signal is received by antenna(s) 102, which is converted to a digital baseband signal 104. Signal 104 is processed by the FET demodulation operation 106 to generate a set of demodulated sub-channel complex symbols at outputs 108 for each transmitted OFDM baud. For each complex symbol in the set of sub-channel symbol outputs 108, a multiplier 110 scales the symbol by the complex conjugate of the current complex channel estimate 146. The scaled complex symbol 112 is then fed into the bit metric computer 114 that produces a bit metric 116 (ideally a soft bit metric) based on the scaled complex symbol 112 and the complex channel estimate magnitude squared 150 that is output from the magnitude squaring operator 148. The soft bit metrics 116 from all sub-channels feed the deinterleaver and viterbi algorithm-based decoder 118 that produces bit decisions 120.

The channel estimator 130 operates on each sub-channel as follows. The bit decisions 120 are fed into a symbol regenerator 124 that re-encodes, interleaves, and maps the bit decisions 120 to produce a regenerated symbol 126 for each sub-channel. The regenerated symbol 126 corresponds to the complex symbol in the set of sub-channel symbol outputs 108 from the FFT demodulator 106 D-symbols ago, due to deinterleaving, decoding, and symbol regeneration delays. The delayed complex sub-channel output 134 comes from a D-symbol delay element 128, and is time-aligned with the regenerated symbol 126. The delayed, time-aligned sub-channel symbol 134 is scaled by the inverse of the regenerated symbol 126 via an inverse operator 132 and multiplier 136, and may be further scaled by a weighting value in accordance with embodiments of the present invention as explained in detail below. The output of the multiplier 136 is the raw channel gain estimate or the weighted raw channel gain estimate from D-symbols ago, which feeds the remaining elements of estimator 130 represented by box 140 in FIG. 1, the output of which is the current channel estimate 146. Elements 140 are in accordance with the various teachings of the present invention as described in more detail below. The channel estimator 130 is ideally predictive in nature due to the non-zero delay D.

Figure 2:
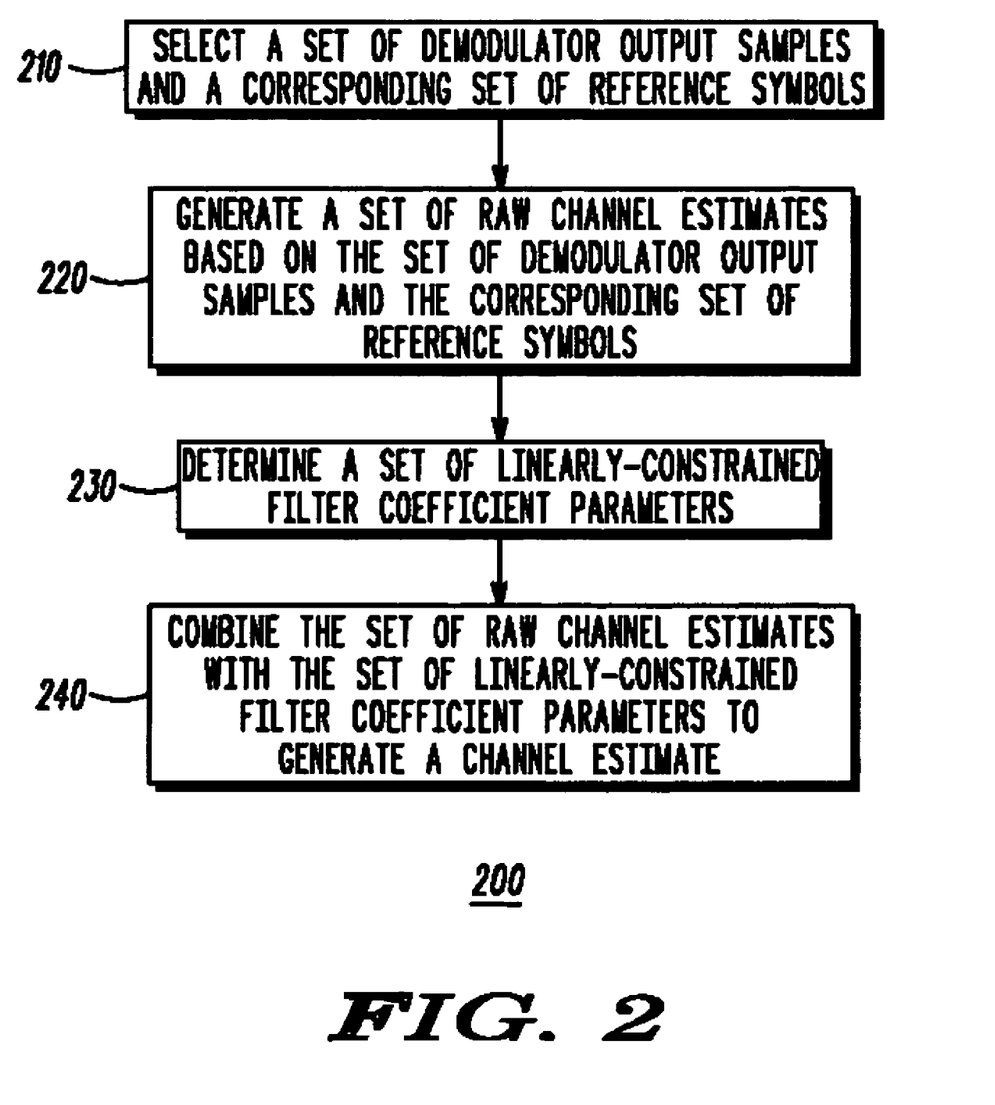
FIG. 2 illustrates a method for channel estimation in accordance with embodiments of the present invention.

Turning now to FIG. 2, a flow diagram illustrating a method for channel estimation in accordance with embodiments of the present invention is shown and generally indicated at 200. However, before detailing the steps of method 200, it would be useful to describe the principles behind reference symbol aided channel estimation. The objective of reference symbol aided channel estimation is to determine an estimate $h_k$ of the channel gain at the kth data symbol. To estimate these quantities a receiver has at its disposal:

an N×1 vector (or set) of demodulated symbol samples $v_k = [v_{1k}\ v_{2k}\ \ldots\ v_{Nk}]^T$, where T denotes transpose;
a vector (or set) of known preamble or regenerated data symbols $p_k = [p_{1k}\ p_{2k}\ \ldots\ p_{Nk}]^T$; and
the expected channel conditions including worst-case Doppler and delay spreads.

For rapidly changing channel conditions, the number N and location of the reference symbols used will typically depend on the data symbol index k. For example, typically only symbols close to a given data symbol in the time or frequency sense will have much influence on the solution. Thus, theoretically, others symbols can be safely ignored in the interest of reducing complexity. In the discussion that follows we will drop the explicit k notation for the sake of simplicity and ease of description.

From estimation theory it can be shown that a linear MMSE estimate of h, given a set of demodulated symbol samples v, can be found according to:

$$\tilde{h} = Kv = R_{hv}R_{vv}^{-1}v \quad (1)$$

where $R_{hv}=E\{hv^H\}$ and $R_{vv}=E\{vv^H\}$, with superscript H denoting a conjugate transpose matrix operation.

The sample vector v can be modeled as $$v = Ph + n, \quad (2)$$

where P=diag(p) is the N×N diagonal matrix of the known symbols, and h and n are N×1 vectors of the channel gains and noise, respectively. Hence, $$R_{hv}=E\{hv^H\}=E\{h(Ph+n)^H\}=E\{hh^HP^H\}+ \\ E\{hn^H\}=E\{hh^H\}P^H, \quad (3)$$

where the second term $E\{hn^H\}$ can be dropped out since noise and channel gain are uncorrelated. $E\{hh^H\}$ can be written as $\gamma r^H_h$, where γ is the average channel power gain and $r_h$ is the normalized N×1 cross-correlation vector of the channel fading between the data symbol instant k and the reference instants. Thus, $$R_{hv}=\gamma r^H_h P^H. \quad (4)$$

In a similar way it can be shown that $R_{vv}$ is equal to $$R_{vv}=\gamma P R_{hh} P^H + R_{nn}, \quad (5)$$

where $R_{hh}$ is the normalized covariance matrix of the channel gains, and $R_{nn}$ is the noise covariance (both N×N). Like $r_h$, $R_{hh}$ can be predetermined according to expected fading statistics.

If we assume that the noise component is stationary and white, then $R_{nn}=\sigma_n^2 I$. Making the appropriate substitutions the estimator (1) becomes $$\tilde{h}=Kv=\gamma r^H_h P^H(\gamma P R_{hh} P^H+\sigma_n^2 I)^{-1}v. \quad (6)$$

This can be further simplified by performing some manipulations involving the square, invertible P matrix, to yield $$\tilde{h}=r^H_h(R_{hh}+(\sigma_n^2/\gamma)P^{-1}P^{-H})^{-1}P^{-1}v. \quad (7)$$

The received signal-to-noise ratio ρ is given by $$\rho = \frac{\gamma E\{|p_i|^2\}}{\sigma_n^2}. \quad (8)$$

The noise term $(\sigma_n^2/\gamma)P^{-1}P^{-H}$ can therefore be written as $\rho^{-1}E\{|p_i|^2\}P^{-1}P^{-H}$. By assuming (for the remainder of the detailed description) that the constellation values for all modulations are normalized such that $E\{|p_i|^2\}=1$, and by defining $g=P^{-1}v$ as the set of "raw" channel gain estimates obtained by dividing the reference symbols into the received samples ($g_i=v_i/p_i$) and $$c=(R_{hh}+\rho_{-1}P^{-1}P^{-H})^{-1}r^*_h \quad (9)$$

as the N×1 vector of estimator coefficients (* denoting complex conjugate), the channel estimator becomes simply $$\tilde{h} = c^T g = \sum_{i=1}^{N} c_i g_i. \quad (10)$$

The estimator described above requires N real-by-complex multiplications per channel estimate for a length-N coefficient vector, in addition to scaling needed to produce the raw channel estimate $g_k=v_k/p_k$. The various embodiments of the present invention provides a means for reducing the number of multiplications (and correspondingly the required coefficient memory) from N to essentially 2, for various embodiments of the estimator 130 as described in detail below.

In accordance with the various teachings of the present invention, the filter coefficients ideally lie on a straight line, i.e. the filter coefficients are linearly-constrained. The phrase linearly-constrained filter coefficients is meant to encompass both coefficients that are designed or forced to lie on a straight line (e.g., those pre-determined in accordance with (18) or (22) below) and those coefficients that would occur on a straight line via normal coefficient calculations (e.g., those pre-determined in accordance with (9) above or (23) below). A linear constraint introduces little or no degradation to estimator performance if the unconstrained coefficients (e.g., those pre-determined in accordance with (9)) are linear or quasi-linear in nature, as is the case for broadband transmission schemes such as the IEEE 802.11a standard and derivatives, even at vehicle speeds. With linear coefficient behavior, the coefficient vector $c=[c_1 \, c_2 \, \ldots \, c_N]^T$ can be defined as $$c_i = a_1 i + a_2 \quad (11)$$

where $a_1$ and $a_2$ are effectively slope and intercept parameters. These parameters are also referred to herein as linearly-constrained filter coefficient parameters. With this definition, the channel estimate calculation in (10) becomes $$\tilde{h}_k = c_k^T g_k \quad (12)$$
$$= \sum_{i=1}^{N} c_{i,k} g_{k-i+1}$$
$$= \sum_{i=1}^{N} (a_{1,k} i + a_{2,k}) g_{k-i+1}$$
$$= a_{1,k} \sum_{i=1}^{N} i g_{k-i+1} + a_{2,k} \sum_{i=1}^{N} g_{k-i+1}$$

Thus, the linefit constraint allows the computation to be simplified from N multiplications to two multiplications involving running sums of $ig_{-i}$ and $g_{-i}$ terms. The running sums are easily computed, as will be seen shortly. Note that the symbol index subscript k has been reintroduced to emphasize the time-varying nature of the coefficients. It should also be noted that in a burst or packet based transmission system such as in the IEEE 802.11a standard, the estimator length N may vary with symbol index. For example, at the beginning of the burst there may be only 1 or 2 preamble symbols upon which to base channel estimates. As additional data symbols are received, decoded and regenerated, the estimator length N ideally increases until a sufficiently large number is reached (and beyond which the unconstrained coefficients are no longer linear), which holds for the remainder of the burst.

A method of deriving the coefficient parameters $a_1$ and $a_2$ will now be described. This method is best suited to the case where the symbol magnitudes are or are assumed to be equal. In matrix form, the estimator's effective coefficient vector c can be written as $$c=Qa \quad (13)$$

where $a=[a_1\ a_2]^T$ and Q is an N×2 matrix given by $$Q = \begin{bmatrix} 1 & 1 \\ 2 & 1 \\ \cdots & \cdots \\ N & 1 \end{bmatrix} \quad (14)$$

Now the channel estimate becomes (dropping the k subscript for clarity)

$$\tilde{h}=c^T g=(Qa)^T g=a^T Q^T g \quad (15)$$

The mean-square estimation error is $$\begin{aligned}\varepsilon^2 &= E\{|\tilde{h}-h|^2\} = E\{(a^T Q^T g - h)(a^T Q^T g - h)^H\} \\ &= E\{a^T Q^T gg^H Qa\} - E\{a^T Q^T gh^*\} - E\{hg^H Qa\} + E\{|h|^2\} \\ &= a^T Q^T E\{gg^H\}Qa - a^T Q^T E\{gh^*\} - E\{hg^H\}Qa + E\{|h|^2\} \\ &= a^T Q^T R_{gg} Qa - a^T Q^T r_{gh} - r_{gh}^H Qa + E\{|h|^2\}\end{aligned} \quad (16)$$

where we have utilized the fact that Q and a are real-valued. Assuming equal magnitude symbols, this leads to $$\varepsilon^2=\gamma(a^T Q^T(R_{hh}+\rho^{-1}I)Qa-a^T Q^T r_h - r_h^H Qa+1) \quad (17)$$

where $\gamma$, $R_{hh}$ and $r_h$ are as defined above. Finally, minimizing $\varepsilon^2$ with respect to a yields the desired MMSE solution for the linearly constrained filter coefficient parameters:

$$a=[Q^T(R_{hh}+\rho^{-1}I)Q]^{-1}Q^T r_h^* \quad (18)$$

We now return to the detailed description of the method 200 for generating a channel estimate for a current demodulator output sample as illustrated in FIG. 2. The channel estimator must select (210) a set of demodulator output samples, $v_i$, and a corresponding set of reference symbols, $p_i$, where i is typically from 1 to N (the number of taps in the estimator) and wherein each selected reference symbol has a time corresponding selected demodulator output sample. Ideally the reference symbols that are used to generate the current channel estimate are a sequence of reference symbols that are 1 to N symbols closest (in time or frequency) to the corresponding current demodulator output sample and may be, for example, a combination of known references symbols and regenerated reference symbols or may be all regenerated reference symbols. Each reference symbol ideally has a magnitude that is one of a number of available symbol magnitudes depending on the modulation type used. For example, if the receiver uses 64QAM, each reference symbol magnitude may be one of the nine different available symbol magnitudes for this modulation type. Alternatively, if the receiver uses 16QAM, each reference symbol magnitude may be one of the three different available symbol magnitudes for this modulation type.

The estimator generates (220) a set (that may be a sequence for instance) of raw channel estimates $g_i$, for example by dividing each selected demodulator output sample $v_i$ by its time corresponding reference symbol $p_i$. Depending on the particular embodiment as discussed in detail below, the raw channel estimates may be further scaled by a weighting factor or value that is based, for instance, on the magnitude of the symbol used to generate a given raw channel estimate. The estimator determines (230) a corresponding set of linearly-constrained filter coefficient parameters. In one embodiment, the corresponding filter coefficient parameters may be predetermined based on (18) or (22) and stored and subsequently retrieved from a look-up table. The look-up table may be indexed based on one or more factors including, by not limited to, channel conditions (e.g. SNR, fading rate), symbol magnitudes, symbol index, etc.

The estimator then combines (240) the set of raw channel estimates with the set of filter coefficient parameters to generate the channel estimate for the current demodulated output sample. In embodiments where the raw channel estimates are scaled by a weighting value, the set of scaled raw channel estimates are combined with the set of filter coefficient parameters to generate the current channel estimate. Various specific embodiments of how the estimator may be configured to perform step 240 are described in detail below by reference to FIGS. 3, 4 and 8. However, we first turn to a more general description of how step 240 may be implemented.

In accordance with the various embodiments of the present invention, step 240 may generally be implemented by generating a first moving sum from the raw channel estimates, where a moving sum is defined as a summer that operates on a finite length moving window of previous input samples; generating a second moving sum from the first moving sum; scaling the first moving sum with a first filter coefficient parameter (e.g., $a_2$); scaling the second moving sum with a second filter coefficient parameter (e.g., $a_1$); and summing the first and second scaled moving sums. The first moving sum may be generated based on a first running sum of the raw channel estimates, where a running sum is defined as a summer that operates on all previous input samples, also referred to in the art as an accumulator. For example, the first moving sum may be generated by subtracting a delayed raw channel estimate from the first running sum. The second moving sum may be generated based on a second running sum of the first running sum. For example, the second moving sum may generated by scaling the delayed raw channel estimate and subtracting the scaled and delayed raw channel estimate from the second running sum.

Figure 3:
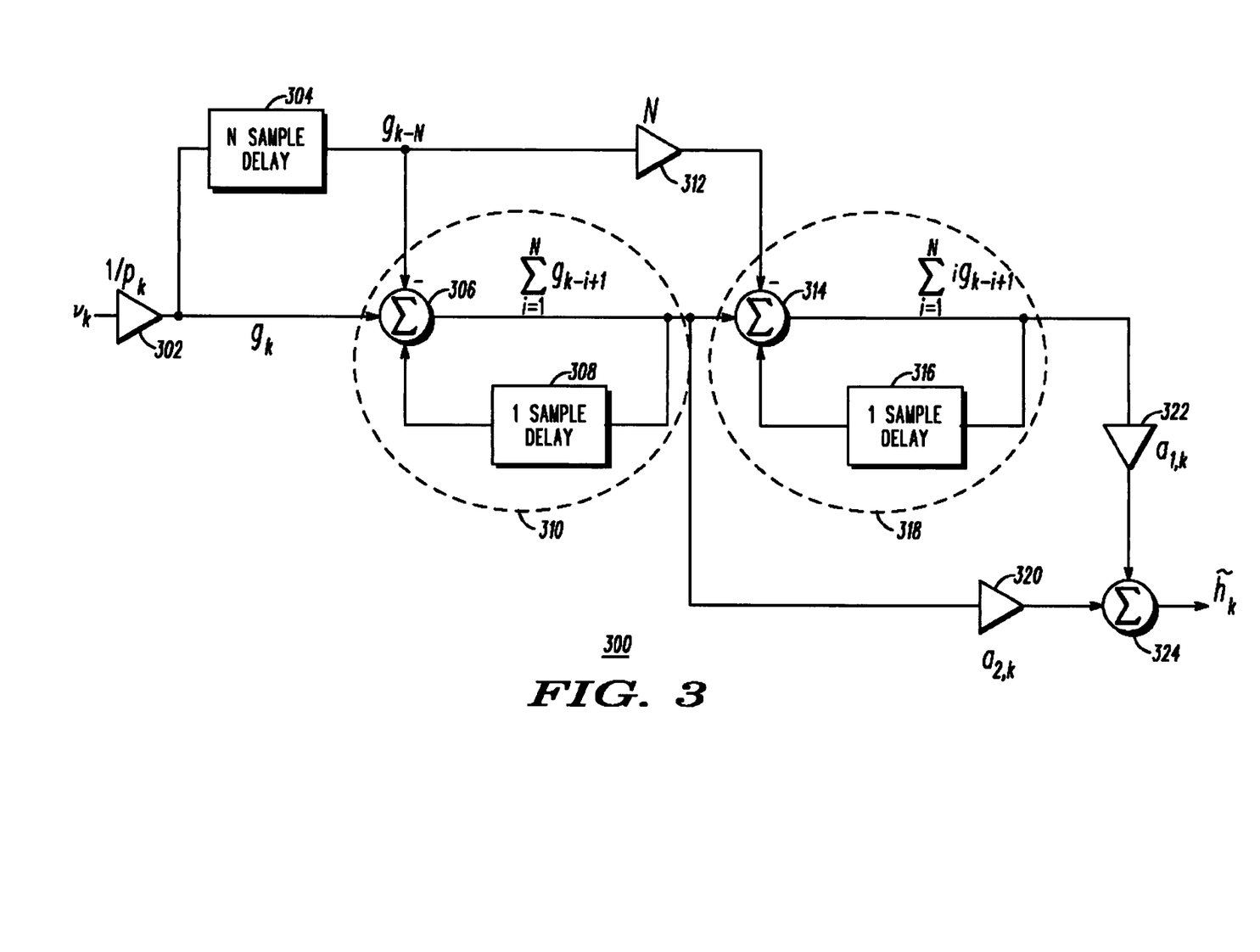
FIG. 3 illustrates a channel estimator that operates in accordance with embodiments of the present invention.

Turning now to FIG. 3, a diagram of a channel estimator in accordance with embodiments of the present invention is shown and generally indicated at 300. Estimator 300 depicts an exemplary implementation of estimator 130 in accordance with (12). Estimator 300 is preferably employed in conjunction with coefficient parameters designed according to (18), wherein the estimator's coefficients are not dependent on reference symbol magnitudes. Estimator 300 may, for example, comprise conventional elements of scalers or multipliers 302, 312, 320 and 322, a delay element 304, a summer 324, an accumulator 310 that includes a summer 306 and a delay element 308, and an accumulator 318 that includes a summer 314 and a delay element 316. Those of ordinary skill in the art will realize that the implementation illustrated in FIG. 3 is merely one example of a channel estimator configuration and that other configurations may be envisioned that are within the scope of the present invention.

In operation, demodulated samples $v_k$ are input at the left and scaled by $1/p_k$ using scaler 302 to produce raw channel estimates $g_k$. The function of the first accumulator 310 comprised of summer 306 and delay block 308 is to produce a running sum $$\sum_{i=1}^{N} g_{k-i+1}$$

of the raw channel estimates. When the maximum number of taps N is reached, the length N delay block 304, in conjunction with the subtraction operation, convert the accumulator 310 into a length-N moving window summer. The second accumulator 318 comprised of summer 314 and delay block 316 produces the running sum $$\sum_{i=1}^{N} i g_{k-i+1}.$$

When the maximum estimator length N is reached, subtraction of delay block 304's output scaled by N via scaler 312 yields the proper moving window summation. The transition in behavior of elements 310 and 318 from accumulators, or running summers, to moving window summers corresponds to their operation starting at the beginning of the burst through steady state. Note that if N is a power of 2 or is reasonably small, this scaling operation can be implemented via a simple shift or shift-and-add approach. If delay block 304's memory is initialized to zero at the start of a burst, proper transition to a steady state length of N (applicable from the middle to the end of a burst) will occur automatically. The output of moving window summer 310 is scaled by $a_{2,k}$ using scaler 320 while the output of moving window summer 318 is scaled by $a_{1,k}$ using scaler 322. The two scaled values are then summed using summer 324 to produce the channel estimate, $\tilde{h}_k$. The time-varying coefficient parameters $a_1$ and $a_2$ can be predetermined using equation 18 and obtained from a lookup table.

Table 1 is presented to help clarify operation of estimator 300 starting at the beginning of the burst. In this example the maximum estimator length N is 6.

TABLE 1

| Symbol Index k | Output of Scaler 302 | Output of Delay Block 304 | Output of Summer 306 | Output of Summer 314 |
|---|---|---|---|---|
| 1 | $g_1$ | 0 | $g_1$ | $g_1$ |
| 2 | $g_2$ | 0 | $g_1 + g_2$ | $2g_1 + g_2$ |
| 3 | $g_3$ | 0 | $g_1 + g_2 + g_3$ | $3g_1 + 2g_2 + g_3$ |
| 4 | $g_4$ | 0 | $g_1 + \ldots + g_4$ | $4g_1 + 3g_2 + \ldots + g_4$ |
| 5 | $g_5$ | 0 | $g_1 + \ldots + g_5$ | $5g_1 + 4g_2 + \ldots + g_5$ |
| 6 | $g_6$ | 0 | $g_1 + \ldots + g_6$ | $6g_1 + 5g_2 + \ldots + g_6$ |
| 7 | $g_7$ | $g_1$ | $g_2 + \ldots + g_7$ | $6g_2 + 5g_3 + \ldots + g_7$ |
| 8 | $g_8$ | $g_2$ | $g_3 + \ldots + g_8$ | $6g_3 + 5g_4 + \ldots + g_8$ |
| . | . | . | . | . |
| . | . | . | . | . |
| . | . | . | . | . |
| k | $g_k$ | $g_{n-N}$ | $\sum_{i=1}^{N} g_{k-i+1}$ | $\sum_{i=1}^{N} i g_{k-i+1}$ |

In another implementation, preferably employed for the case of multi-level constellations, the channel filter estimator's coefficients are based on the magnitudes of the reference symbols. In this case, the raw channel estimates are ideally scaled using a weighting value that is based on their symbol magnitude dependent noise level, prior to coefficient operations. The coefficient vector for this implementation may be written as $$c = WQa, \tag{19}$$

where $W = \text{diag}(w) = \text{diag}([w_1 \ w_2 \ \ldots \ w_N])$ is a diagonal weighting matrix, $a = [a_1 a_2]^T$ and Q is defined in (14). The channel estimate then becomes $$\tilde{h}_k = c^T g_k = a_1 \sum_{i=1}^{N} i w_{k-i+1} g_{k-i+1} + a_2 \sum_{i=1}^{N} w_{k-i+1} g_{k-i+1} \tag{20}$$

Thus, constraint (19) allows the computation to be simplified from a maximum of N multiplications to essentially two multiplications involving running sums of $iw_{-i}g_{-i}$ and $w_{-i}g_{-i}$ terms. As in the previous implementation, these sums are easily computed, as will be seen shortly. Note that this can be viewed as a linearly constrained coefficient vector $c_{LC} = Qa$ operating on weighted raw channel estimates Wg.

By a procedure similar to that described above, it can be shown that the MMSE solution for a is given by $$a = [Q^T W(R_{hh} + \rho^{-1} U) W Q]^{-1} Q^T W r_h^* \tag{21}$$

where $U = \text{diag}(u) = \text{diag}([u_1 \ u_2 \ \ldots \ u_N])$ is a set of symbol magnitude dependent noise level weights as defined below. To minimize the number of symbol magnitude dependent coefficient parameter sets, we set $U = W^{-1}$. This leads to the following solution for the linearly constrained filter coefficient parameters:

$$a = [Q^T W(R_{hh} + \rho^{-1} W^{-1}) W Q]^{-1} Q^T W r_h^* \tag{22}$$

Figure 4:
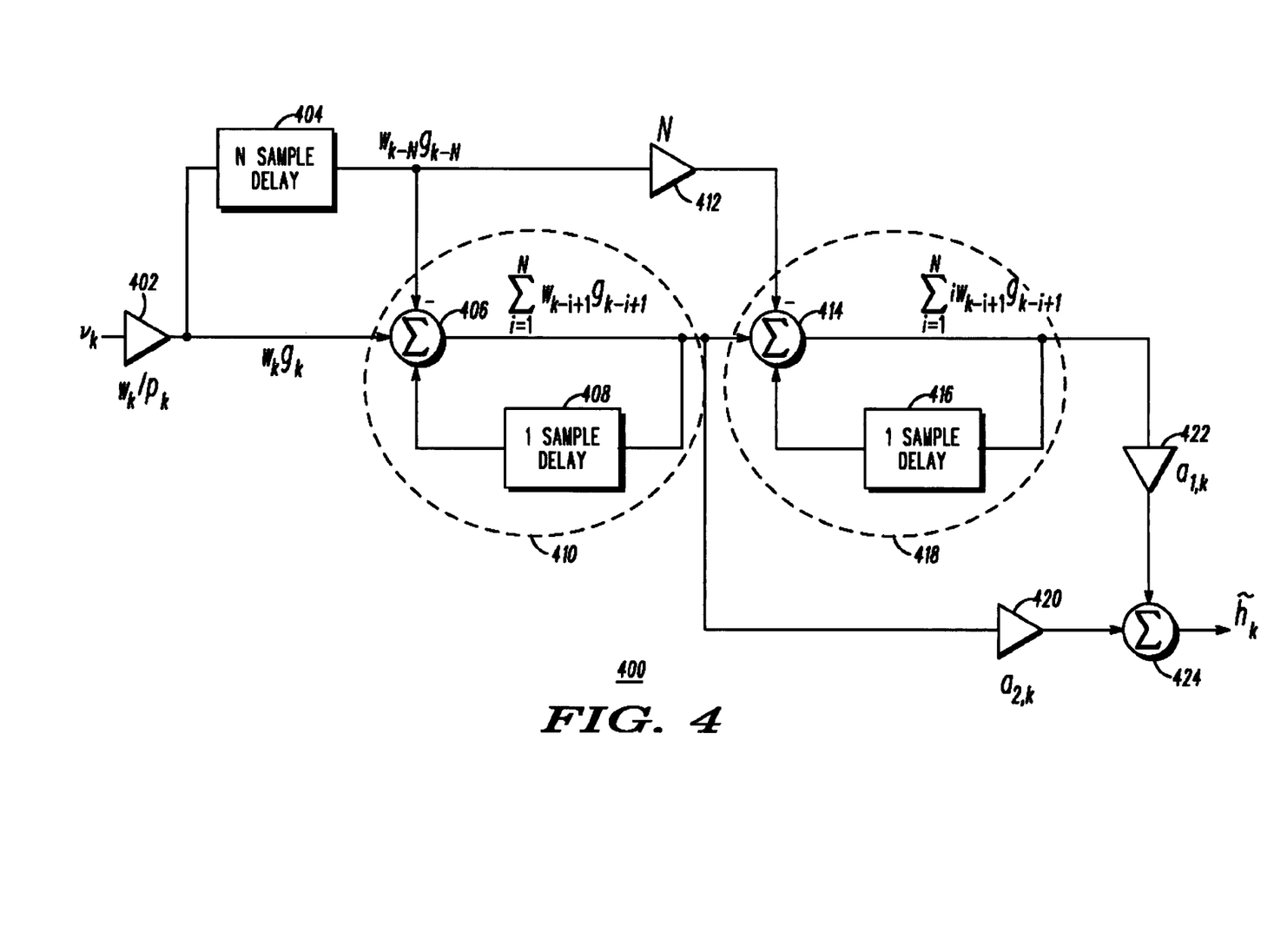
FIG. 4 illustrates a channel estimator that operates in accordance with embodiments of the present invention.

Turning now to FIG. 4, a channel estimator in accordance with embodiments of the present invention is shown and generally indicated at 400. Estimator 400 depicts an exemplary implementation of estimator 130 in accordance with (20) where there is no subdividing of reference symbols into a plurality of subsets for the purpose of applying different symbol magnitude quantization schemes. The concepts of reference symbol magnitude quantization and subdivision into subsets are described more fully below. Symbol magnitude quantization may be applied to above-described implementation, with the weighting factors based on the applied quantization scheme.

Estimator 400 may, for example, comprise conventional elements of scalers or multipliers 402, 412, 420 and 422, a delay element 404, a summer 424, an accumulator 410 that includes a summer 406 and a delay element 408, and an accumulator 418 that includes a summer 414 and a delay element 416. Those of ordinary skill in the art will realize that the implementation illustrated in FIG. 4 is merely one example of a channel estimator configuration and that other configurations may be envisioned that are within the scope of the present invention.

In operation, demodulated samples $v_k$ are input at the left and scaled by $w_k/p_k$ using scaler 402 to produce weighted raw channel estimates $w_k g_k$. The weights Wk are nominally equal to $|p_k|^2$ if there is no symbol magnitude quantization, or $u_k^{-1}$ if there is quantization. Note that if quantization is not employed, the scaling term $w_k/p_k$ is equal to $p_k^*$. The function of the first accumulator 410 comprised of summer 406 and delay block 408 is to produce a running sum $$\sum_{i=1}^{N} w_{k-i+1} g_{k-i+1}$$

of the raw channel estimates. When the maximum number of taps N is reached, the length N delay block 404, in conjunction with the subtraction operation at summer 406, convert the accumulator 410 into a moving window summer. The second accumulator 418 comprised of summer 414 and delay block 416 produces the running sum $$\sum_{i=1}^{N} i w_{k-i+1} g_{k-i+1}.$$

When the maximum estimator length N is reached, subtraction of delay block 404's output scaled by N via scaler 412 yields the proper moving window summation. The transition in behavior of elements 410 and 418 from accumulators, or running summers, to moving window summers corresponds to their operation starting at the beginning of the burst through steady state. Note that if N is a power of 2 or is reasonably small, the scaling operation of gain block 412 can be implemented via a simple shift or shift-and-add approach. If delay block 404's memory is initialized to zero at the start of the burst, proper transition to a steady state length of N will occur automatically. The output of moving window summer 410 is scaled by $a_{2,k}$ using scaler 420 while the output of moving window summer 418 is scaled by $a_{1,k}$ using scaler 422. The two scaled values are then summed using summer 424 to produce the channel estimate, $\tilde{h}_k$. The time-varying coefficient parameters $a_1$ and $a_2$ can be predetermined using equation 22 and obtained from a lookup table.

Table 2 is presented to help clarify operation of estimator 400. Signal values are very similar to that of estimator 300, except for the weighting applied to the raw channel estimates. In this example the maximum estimator length N is 6.

Figure 5:
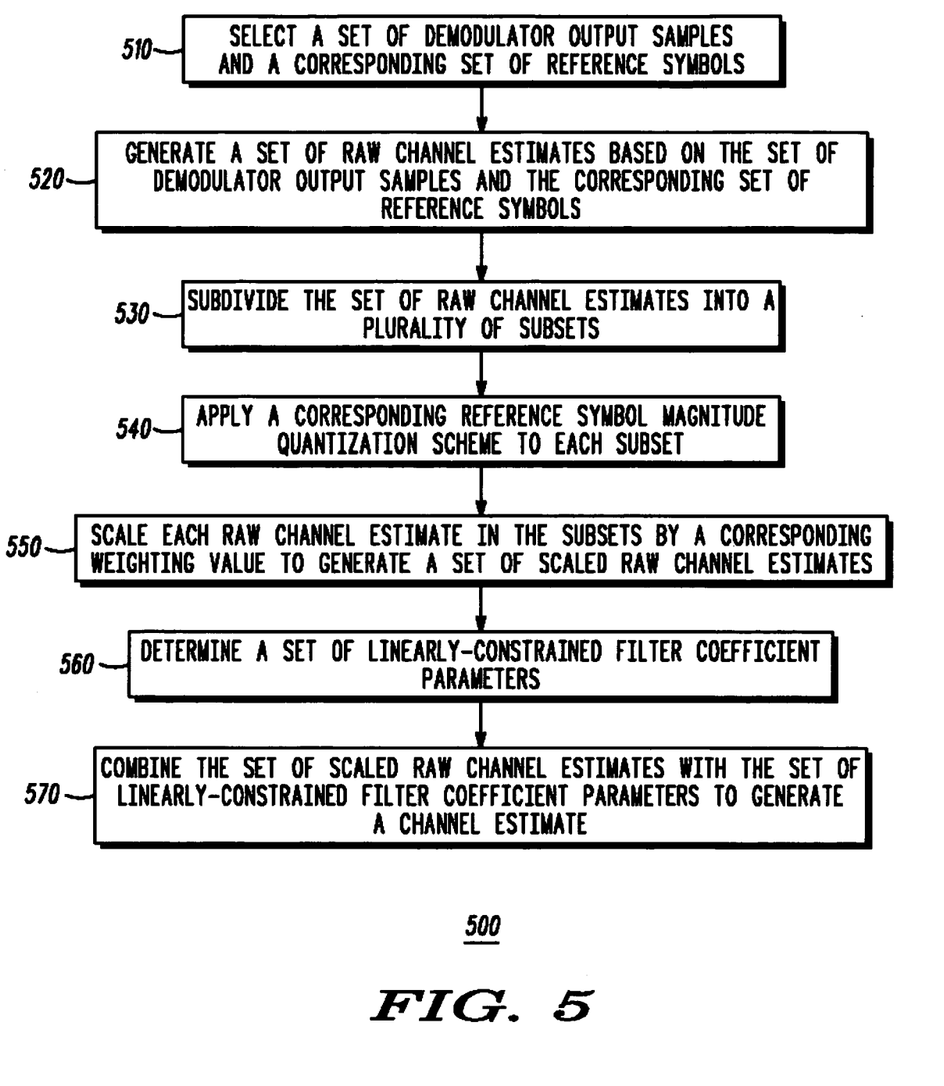
FIG. 5 illustrates a method for channel estimation in accordance with embodiments of the present invention.

Turning now to FIG. 5, a flow diagram illustrating a method for channel estimation in accordance with embodiments of the present invention is shown and generally indicated at 500. In this embodiment the set of raw channel estimates may be divided into a plurality of (i.e., at least two) subsets and quantization schemes applied to each subset. To implement method 500, the channel estimator must select (510) a set of demodulator output samples, $v_i$, and a corresponding set of reference symbols, $p_i$, where i is typically from 1 to N (the number of taps in the estimator) and wherein each selected reference symbol has a time corresponding selected demodulator output sample. Ideally the reference symbols that are used to generate the current channel estimate are a sequence of reference symbols that are 1 to N symbols closest (in time or frequency) to the corresponding current demodulator output sample and may be, for example, a combination of known references symbols and regenerated reference symbols or may be all regenerated reference symbols. Each reference symbol ideally has a magnitude that is one of the available symbol magnitudes depending on the modulation type used.

The estimator generates (520) a set (that may be a sequence for instance) of raw channel estimates $g_i$, for example by dividing each selected demodulator output sample $v_i$ by its time corresponding reference symbol $p_i$. The estimator subdivides (530) the set of raw channel estimates into a plurality of subsets, wherein the step of subdividing is ideally based upon one or more criteria such as, for instance, age or relevance. There may be anywhere from one to N–1 raw channel estimates in each subset.

Figure 6:
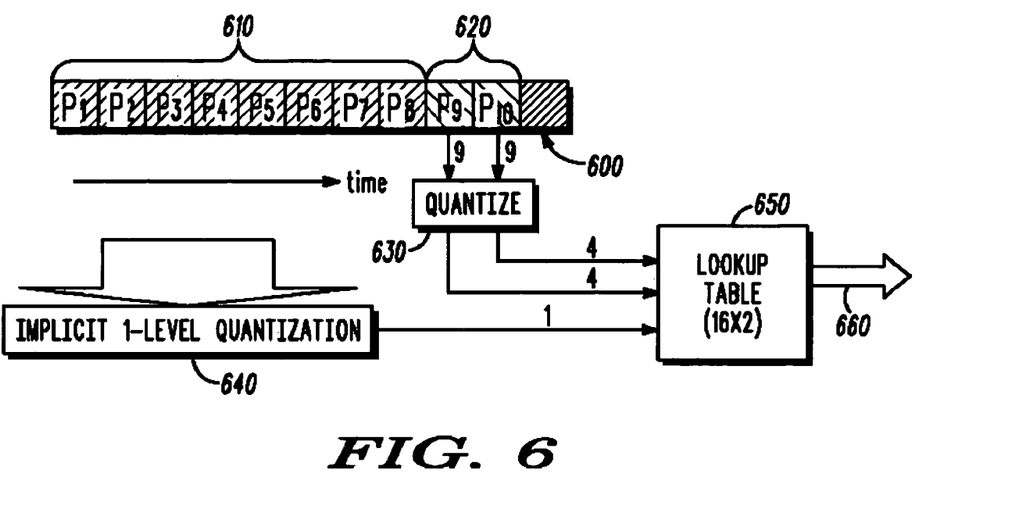
FIG. 6 illustrates an example of a reference symbol quantization scheme that may be used in various embodiment of the present invention.

For example in one embodiment, which will be explained in more detail below by reference to FIGS. 6 and 7, a sequence of raw channel estimates may be subdivided based upon comparing the age of the raw channel estimates to a threshold. The age of a given raw channel estimate $g_i$ may be determined, for instance, based on how close the corresponding $p_i$ (used to generate the channel estimate) is to the current demodulated output sample in time. Alternatively, the relevance of a given raw channel estimate $g_i$ may be determined based on how close the corresponding $p_i$ (used to generate the channel estimate) is to the current demodulated output sample in frequency.

The estimator applies (540) a corresponding reference symbol magnitude quantization scheme to each subset used. It should be readily understood that a quantization scheme could be assigned to each subset a priori (e.g., prior to the

TABLE 2

| Symbol Index k | Output of Scaler 402 | Output of Delay Block 404 | Output of Summer 406 | Output of Summer 414 |
|---|---|---|---|---|
| 1 | $w_1 g_1$ | 0 | $w_1 g_1$ | $w_1 g_1$ |
| 2 | $w_2 g_2$ | 0 | $w_1 g_1 + w_2 g_2$ | $2w_1 g_1 + w_2 g_2$ |
| 3 | $w_3 g_3$ | 0 | $w_1 g_1 + w_2 g_2 + w_3 g_3$ | $3w_1 g_1 + 2w_2 g_2 + w_3 g_3$ |
| 4 | $w_4 g_4$ | 0 | $w_1 g_1 + \ldots + w_4 g_4$ | $4w_1 g_1 + 3w_2 g_2 + \ldots + w_4 g_4$ |
| 5 | $w_5 g_5$ | 0 | $w_1 g_1 + \ldots + w_5 g_5$ | $5w_1 g_1 + 4w_2 g_2 + \ldots + w_5 g_5$ |
| 6 | $w_6 g_6$ | 0 | $w_1 g_1 + \ldots + w_6 g_6$ | $6w_1 g_1 + 5w_2 g_2 + \ldots + w_6 g_6$ |
| 7 | $w_7 g_7$ | $w_1 g_1$ | $w_2 g_2 + \ldots + w_7 g_7$ | $6w_2 g_2 + 5w_3 g_3 + \ldots + w_7 g_7$ |
| 8 | $w_8 g_8$ | $w_2 g_2$ | $w_3 g_3 + \ldots + w_8 g_8$ | $6w_3 g_3 + 5w_4 g_4 + \ldots + w_8 g_8$ |
| . | . | . | . | . |
| . | . | . | . | . |
| . | . | . | . | . |
| k | $w_k g_k$ | $w_{k-N} g_{n-N}$ | $\sum_{i=1}^{N} w_{k-i+1} g_{k-i+1}$ | $\sum_{i=1}^{N} w_{k-i+1} g_{k-i+1}$ | actual channel estimations being generated) and the quantization scheme applied on an instantaneous basis as the channel estimates are being generated. The quantization scheme could be a single-level quantization scheme, a multi-level quantization scheme, or no quantization, wherein the quantization scheme may generally also depend on the criteria used to subdivide the set of raw channel estimates. In a single-level quantization scheme, the plurality of symbol magnitudes associated with the selected set of reference symbols is quantized to one level. In a multi-level quantization scheme, the plurality of symbol magnitudes associated with the selected set of reference symbols is quantized to two or more levels. Finally, where the quantization scheme is no quantization, the plurality of symbol magnitudes associated with the selected set of reference symbols are not quantized at all.

For example, in one implementation the estimator may divide the set of raw channel estimates into two subsets based upon whether the age of raw channel estimates is within an age threshold. More specifically, the age threshold is based on how close a selected regenerated symbol is in time to the current demodulator output sample. Those raw channel estimates that are computed from a selected regenerated symbol that is outside of the age threshold are ideally assigned a single-level quantization scheme, which may be, for example, to assume equal magnitude symbols. The more recent symbols that are within the age threshold, e.g., that are the most R recent symbols (such as the closest 2 or 3 symbols) could be, for example, assigned a quantization scheme of no quantization wherein the corresponding coefficients (and coefficient parameters) are based upon the symbol magnitude. Such an approach is based on the realization that the observations further back in time should have less influence on the channel estimate. So a suboptimal, equal-magnitude assumption should have less impact if confined there.

Recall from (9) that the ideal solution for the (unconstrained) estimator coefficients is a function of the reference symbol magnitudes, due to the $P^{-1}P^{-H}$ term, which equals $diag([|p_1|^{-2} |p_2|^{-2} \ldots |p_N|^{-2}])$. This term reflects the noise levels (including possible noise enhancement) associated with the raw channel estimates. For multi-level constellations, the ideal solution may result in a large number of coefficient sets and a correspondingly large memory requirement. In order to reduce the required memory, the $P^{-1}P^{-H}$ term may be replaced by a diagonal matrix U representing an assumed set of noise levels based on quantized symbol magnitudes. With this approach, the coefficient vector is given by $$c = (R_{hh} + \rho^{-1}U)^{-1}r_h^*, \quad (23)$$

where $U = diag(u) = diag([u_1 \, u_2 \, \ldots \, u_N])$ defines a set of noise level weights. This same approach can be used in deriving linearly constrained filter coefficient parameters, as exemplified by (21) above. For the most recent R (e.g., 2 or 3) symbols, the weights are set to their nominal, symbol-dependent values, i.e., $u_i = |p_i|^{-2}$ for i=1 to R. For the remaining, earlier symbols, the weights are set to the average noise enhancement level $E\{|p_i|^{-2}\}$ corresponding to each symbol's modulation type, i.e., $u_i = 1$, 1.9, and 2.7 for PSK, 16QAM, and 64QAM, respectively. Thus, the earlier symbols are in effect subjected to single-level quantization.

Note that at the beginning of a burst, the early portion of the observation interval may contain two modulation types (for example, binary PSK preamble/Signal fields, followed by 16QAM or 64QAM data), resulting in two different weights. With this approach, the maximum number of coefficient (or coefficient parameter) sets per symbol index is reduced from $M^N$ to $M^R$, where M is the number of distinct symbol magnitudes (3 and 9 for 16QAM and 64QAM, respectively).

In addition, the R symbol-dependent weights may be quantized. This may be done by partitioning the M possible symbol magnitudes into Q subsets, where Q<M. All symbols whose magnitudes belong to a particular subset q (q=1 to Q) are assigned a common weight $U_q$ equal to the average noise enhancement for that subset. With this approach, the maximum number of coefficient (or coefficient parameter) sets is further reduced from $M^R$ to $Q^R$.

Returning again to the method for channel estimation illustrated in FIG. 5, the channel estimator scales (550) each raw channel estimate in the subsets by a corresponding weighted value to generate a set of scaled raw channel estimates that includes the scaled raw channel estimates from all of the subsets. For each raw channel estimate, the weighting value is ideally based on at least the magnitude of the reference symbol used to generate the raw channel estimate and on the applied quantization scheme. The estimator determines (560) a corresponding set of linearly-constrained filter coefficient parameters, which, for example, may be obtained from a look-up table. The estimator then combines (570) the set of scaled raw channel estimates with the set of coefficient parameters to generate the channel estimate for the current demodulated output sample.

It should be readily appreciated that quantization is most advantageous for 64QAM, since it has the largest number of available symbol magnitudes. Accordingly, FIGS. 6 and 7 illustrate an application of the present invention based upon a receiver using this modulation type. FIG. 6 illustrates a set ($p_1$–$p_{10}$) of regenerated symbols from which a corresponding set of raw channel estimates are calculated. As can be seen the regenerated symbols (and hence the raw channel estimates) are subdivided into two subsets 610 and 620, wherein the symbols in subset 620 (i.e., symbols $p_9$ and $p_{10}$) fall within the threshold of being within R=2 symbols away from the current symbol 600. Whereas, the symbols in subset 610 fall outside of the threshold of being within R=2 symbols away from the current symbol 600. A single-level quantization scheme is assigned to the symbols in subset 610 by (implicit) 1-level quantizer 640, and a multi-level (in this case a four-level, i.e., Q=4) quantization scheme is applied to subset 620 by quantizer 630. Quantizer 640 is referred to as implicit since, with a single-level output, no actual quantization need be implemented. A quantization level (e.g., represented by quantization subset index q) for each of the symbols in subset 620 is output by quantizer 630. The values output by quantizers 630 and 640, in addition to other possible inputs including symbol index as previously mentioned, are input to lookup table 650, which outputs channel estimator coefficient parameters 660, $a_1$ and $a_2$.

Figure 7:
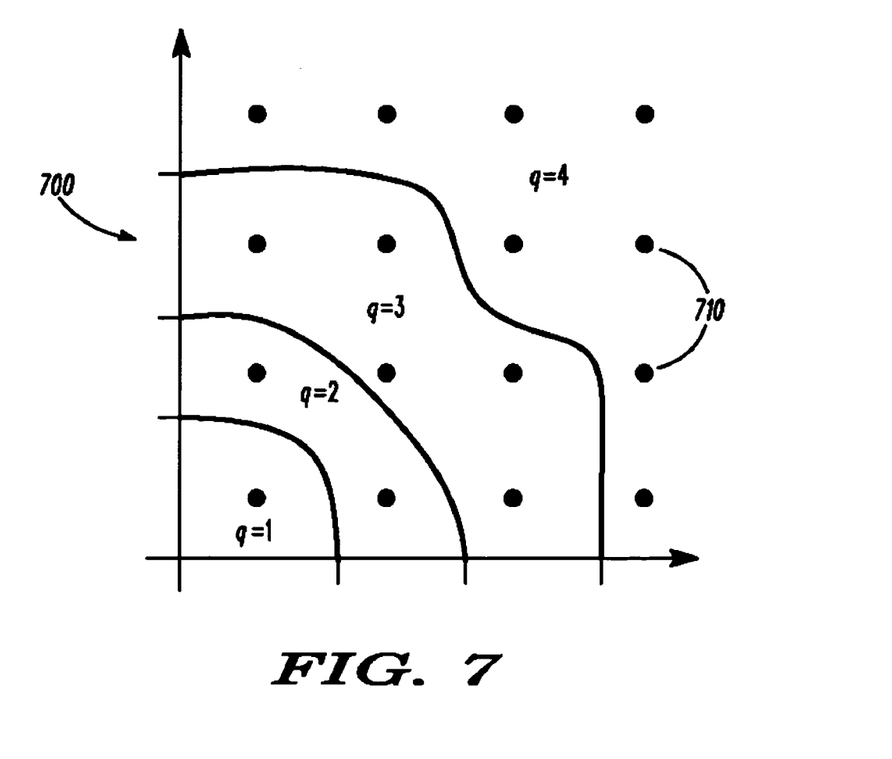
FIG. 7 is a 64-QAM quarter constellation plot of symbol magnitudes used to illustrate the reference symbol quantization scheme shown in FIG. 6.

FIG. 7 shows the upper-right quadrant of the 64QAM constellation with an exemplary 4-ary partition for q=1 to 4, which may be used as the quantization scheme for subset 620. Those skilled in the art will realize that the other quadrants are symmetric. For the best receiver performance, symbols causing the greatest noise enhancement are ideally most accurately characterized. Hence, the inner constellation points in this partition are left separate. Table 3 gives exemplary noise weights for the quantization scheme illustrated in FIG. 7.

TABLE 3

| q | Noise Weight $U_q$ |
|---|---|
| 1 | 21 |
| 2 | 4.2 |
| 3 | 1.607 |
| 4 | 0.692 |

The methods in accordance with various embodiments of the present invention provide for a quantization approach wherein the number of levels Q is varied according to a temporal subset, with no quantization or higher values of Q used for more recent subsets. Those skilled in the art will realize that if two-dimensional estimation (i.e., additionally utilizing channel information from other subchannels) is employed, the same approach can be used, but the number of quantization levels is varied according to the time-frequency distance between the observation and estimation instants.

Figure 8:
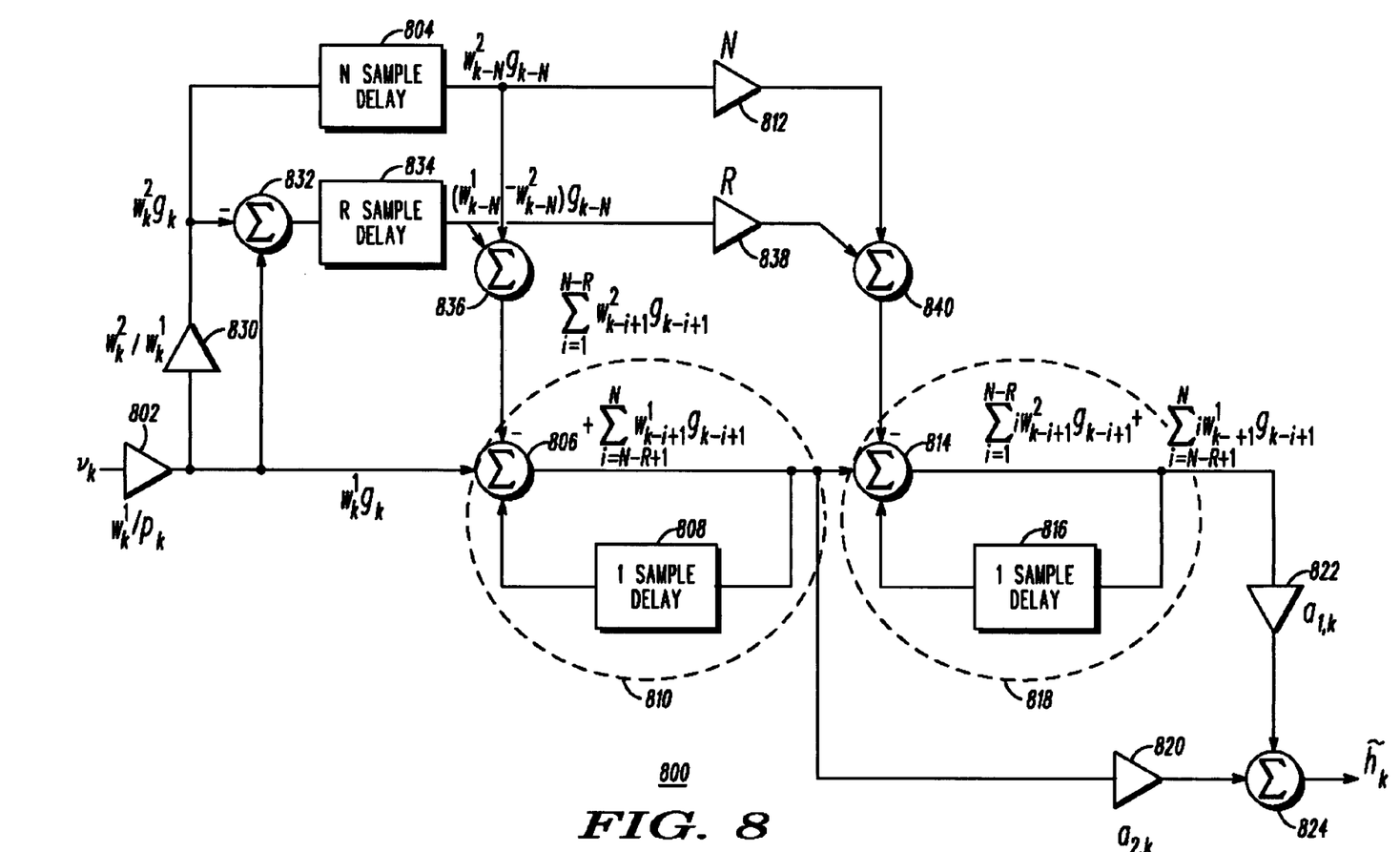
FIG. 8 illustrates a channel estimator that operates in accordance with embodiments of the present invention.

Turning now to FIG. 8, a diagram of a channel estimator in accordance with embodiments of the present invention is shown and generally indicated at 800. Estimator 800 depicts an exemplary implementation of estimator 130 for the case of two symbol magnitude quantization subsets, with the older subset having one quantization level. With two subsets it is necessary to introduce and distinguish between two categories of weights. The first category of weights (referred to as short-term) pertain to the most recent R observations, and will be denoted with superscript 1 (e.g., $w_k^1$). These weights are nominally equal to $|p_k|^2$ if there is no symbol magnitude quantization, or $u_k^{-1}$ if there is quantization. When observations transition from the most recent R samples to the older length-(N–R) subset, they become subject to the second category of weights (referred to as long-term), which are denoted by superscript 2 (e.g., $w_k^2$). In accordance with a single magnitude quantization level, these weights are nominally equal to the reciprocal of the average noise enhancement level $E\{|p_l|^{-2}\}$ corresponding to each symbol's modulation type, e.g., $w_k^2=1$, $1.9^{-1}$, and $2.7^{-1}$ for PSK, 16QAM, and 64QAM, respectively.

Referring again to the diagram of estimator 800, estimator 800 may, for example, comprise conventional elements of scalers or multipliers 802, 830, 812, 838, 820 and 822, delay elements 804 and 834, summers 832, 836, 840 and 824, an accumulator 310 that includes a summer 806 and a delay element 808, and an accumulator 818 that includes a summer 814 and a delay element 816. Those of ordinary skill in the art will realize that the implementation illustrated in FIG. 8 is merely one example of a channel estimator configuration and that other configurations may be envisioned that are within the scope of the present invention.

In operation, demodulated samples $v_k$ are input at the left. In this implementation, the short-term weighting is combined with the raw channel estimate scaling and realized by $w_k^1/p_k$ scaling block 802 to produce weighted raw channel estimates $w_k^1 g_k$. Note that if quantization is not employed, the scaling term $w_k^1/p_k$ is equal to $p_k^*$. The short-term weighting is subsequently replaced by long-term weighting via the $w_k^2/w_k^1$ scaling block 830 operating in conjunction with length R delay block 834, R scaler block 838 and summers 832, 836 and 840. The function of the first accumulator 810 comprised of summer 806 and delay block 808 is to produce a running sum $$\sum_{i=1}^{N} w_{k-i+1}^{1,2} g_{k-i+1}$$

of the raw channel estimates. When the maximum number of taps N is reached, the length N delay block 804, in conjunction with the subtraction operation at summer 806, convert the accumulator 810 into a moving window summer. The second accumulator 818 comprised of summer 814 and delay block 816 produces the running sum $$\sum_{i=1}^{N} i w_{k-i+1}^{1,2} g_{k-i+1}.$$

When the maximum estimator length N is reached, subtraction of the delay block 804's output scaled by N via scaling block 812 yields the proper moving window summation. The transition in behavior of elements 810 and 818 from accumulators, or running summers, to moving window summers corresponds to their operation starting at the beginning of the burst through steady state. Note that if N and R are powers of 2 or are reasonably small, the scaling provided by scaling blocks 812 and 838 can be implemented via a simple shift or shift-and-add approach. If the memories of delay blocks 804 and 834 are initialized to zero at the start of the burst, proper transition to a steady state length of N will occur automatically. The output of moving window summer 810 is scaled by $a_{2,k}$ using scaler 820 while the output of moving window summer 818 is scaled by $a_{1,k}$ using scaler 822. The two scaled values are then summed using summer 824 to produce the channel estimate, $\hbar_k$. The time-varying coefficient parameters $a_1$ and $a_2$ can be predetermined using equation 22 and obtained from a lookup table.

Table 4 is presented to help clarify operation of estimator 800. In this example the maximum estimator length N is 6, and number of most recent samples R is 2.

TABLE 4

| k | Output of Delay Block 804 | Output of Delay Block 834 | Output of Summer 806 | Output of Summer 814 |
|---|---|---|---|---|
| 1 | 0 | 0 | $w_1^1 g_1$ | $w_1^1 g_1$ |

TABLE 4-continued

| k | Output of Delay Block 804 | Output of Delay Block 834 | Output of Summer 806 | Output of Summer 814 |
|---|---|---|---|---|
| 2 | 0 | 0 | $w_1^1 g_1 + w_2^1 g_2$ | $2w_1^1 g_1 + w_2^1 g_2$ |
| 3 | 0 | $(w_1^1 - w_1^2)g_1$ | $w_1^2 g_1 + w_2^1 g_2 + w_3^1 g_3$ | $3w_1^2 g_1 + 2w_2^1 g_2 + w_3^1 g_3$ |
| 4 | 0 | $(w_2^1 - w_2^2)g_2$ | $w_1^2 g_1 + w_2^2 g_2 + w_3^1 g_3 + w_4^1 g_4$ | $4w_1^2 g_1 + 3w_2^2 g_2 + 2w_3^1 g_3 + w_4^1 g_4$ |
| 5 | 0 | $(w_3^1 - w_3^2)g_3$ | $w_1^2 g_1 + \cdots + w_3^2 g_3 + w_4^1 g_4 + w_5^1 g_5$ | $5w_1^2 g_1 + \cdots + 3w_3^2 g_3 + 2w_4^1 g_4 + w_5^1 g_5$ |
| 6 | 0 | $(w_4^1 - w_4^2)g_4$ | $w_1^2 g_1 + \cdots + w_4^2 g_4 + w_5^1 g_5 + w_6^1 g_6$ | $6w_1^2 g_1 + \cdots + 3w_4^2 g_4 + 2w_5^1 g_5 + w_6^1 g_6$ |
| 7 | $w_1^2 g_1$ | $(w_5^1 - w_5^2)g_5$ | $w_2^2 g_2 + \cdots + w_5^2 g_5 + w_6^1 g_6 + w_7^1 g_7$ | $6w_2^2 g_2 + \cdots + 3w_5^2 g_5 + 2w_6^1 g_6 + w_7^1 g_7$ |
| 8 | $w_2^2 g_1$ | $(w_6^1 - w_6^2)g_6$ | $w_3^2 g_3 + \cdots + w_6^2 g_6 + w_7^1 g_7 + w_8^1 g_8$ | $6w_3^2 g_3 + \cdots + 3w_6^2 g_6 + 2w_7^1 g_7 + w_8^1 g_8$ |
| . | . | . | . | . |
| . | . | . | . | . |
| . | . | . | . | . |
| k | $w_k^2 g_1$ | $(w_{k-R}^1 - w_{k-R}^2)g_{k-R}$ | $\sum_{i=1}^{N-R} w_{k-i+1}^2 g_{k-i+1} + \sum_{i=N-R+1}^{N} w_{k-i+1}^1 g_{k-i+1}$ | $\sum_{i=1}^{N-R} (iw)_{k-i+1}^2 g_{k-i+1} + \sum_{i=N-R+1}^{N} (iw)_{k-i+1}^1 g_{k-i+1}$ |

While Estimator 800 depicts an exemplary implementation of estimator 130 for the case of two symbol magnitude quantization subsets, it will be apparent that this representative method may be readily extended to the case of more than two subsets. This may be accomplished by including, for each additional subset, a processing sub-block comprising elements similar to scaling blocks 830 and 838, delay block 834, and summers 836 and 840, and adjusting the parameters of these additional elements appropriately.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for reference symbol aided channel estimation comprising the steps of:
    selecting a set of demodulator output samples and a corresponding set of reference symbols each having a magnitude;
    generating a set of raw channel estimates based on the set of demodulator output samples and the corresponding set of reference symbols;
    determining a set of linearly-constrained filter coefficient parameters; and
    combining the set of raw channel estimates with the set of linearly-constrained filter coefficient parameters to generate a channel estimate.

2. The method of claim 1, wherein each set of linearly-constrained filter coefficient parameters includes a first and second filter coefficient parameter, respectively $a_1$ and $a_2$, that are related to a corresponding set of filter coefficients $c_i$ in accordance with the equation $c_i = a_1 i + a_2$.

3. The method of claim 2, wherein at least one set of corresponding filter coefficients are predetermined in accordance with the equation $c_i = a_1 i + a_2$.

4. The method of claim 1, wherein the filter coefficient parameters are retrieved from a look-up table.

5. The method of claim 1, wherein the step of combining the set of raw channel estimates with the set of linearly-constrained filter coefficient parameters to generate the channel estimate comprises the steps of:
    generating a first moving sum from the raw channel estimates;
    generating a second moving sum from the first moving sum;
    scaling the first moving sum with a first filter coefficient parameter included in the set of filter coefficient parameters;
    scaling the second moving sum with a second filter coefficient parameter included in the set of filter coefficient parameters; and
    summing the first and second scaled moving sums.

6. The method of claim 5, wherein:
    the first moving sum is generated based on a first running sum of the raw channel estimates; and
    the second moving sum is generated based on a second running sum of the first running sum.

7. The method of claim 6, wherein;
    the first moving sum is generated by subtracting a delayed raw channel estimate from the first running sum; and the second moving sum is generated by scaling the delayed raw channel estimate and subtracting the scaled and delayed raw channel estimate from the second running sum.

8. The method of claim 1 further comprising scaling each raw channel estimate in the set of raw channel estimates by a corresponding weighting value to generate a set of scaled raw channel estimates, wherein the channel estimate is generated by combining the set of scaled raw channel estimates with the set of filter coefficient parameters.

9. The method of claim 8, wherein the corresponding weighting value is based on the magnitude of the reference symbol used to generate the corresponding raw channel estimate.

10. The method of claim 9 further comprising subdividing the set of raw channel estimates into a plurality of subsets, and applying a corresponding reference symbol magnitude quantization scheme to each subset, wherein the corresponding weighting value is further based on the applied quantization scheme.

11. The method of claim 9 further comprising applying a corresponding reference symbol magnitude quantization scheme to the set of raw channel estimates, wherein the corresponding weighting value is further based on the applied quantization scheme.

12. The method of claim 1, wherein each reference symbol magnitude is one of available symbol magnitudes in at least one of a Quadrature Amplitude Modulation (QAM) scheme and a Phase Shift Keying (PSK) scheme.

13. A method for reference symbol aided channel estimation comprising the steps of:
   selecting a set of demodulator output samples and a corresponding set of reference symbols each having a magnitude;
   generating a set of raw channel estimates based on the set of demodulator output samples and the corresponding set of reference symbols;
   subdividing the set of raw channel estimates into a plurality of subsets;
   applying a corresponding reference symbol magnitude quantization scheme to each subset;
   scaling each raw channel estimate in the subsets by a corresponding weighting value to generate a set of scaled raw channel estimates, wherein the corresponding weighting value is based on the magnitude of the reference symbol used to generate the corresponding raw channel estimate and the applied quantization scheme;
   determining a set of linearly-constrained filter coefficient parameters; and
   combining the set of scaled raw channel estimates with the set of linearly-constrained filter coefficient parameters to generate a channel estimate.

14. The method of claim 13, wherein one subset is assigned a single-level quantization scheme.

15. The method of claim 13, wherein at least one subset is assigned a quantization scheme of no quantization.

16. The method of claim 13, wherein at least one subset is assigned a multi-level quantization scheme.

17. A receiver comprising:
   at least one antenna element for receiving a signal;
   receiver circuitry for generating a baseband signal from the received signal;
   a demodulator for generating output samples from the baseband signal; and
   a processor configured for performing the steps of:
      selecting a set of demodulator output samples and a corresponding set of reference symbols each having a magnitude;
      generating a set of raw channel estimates based on the set of demodulator output samples and the corresponding set of reference symbols;
      determining a set of linearly-constrained filter coefficient parameters; and
      combining the set of raw channel estimates with the set of linearly-constrained filter coefficient parameters to generate a channel estimate.

18. The receiver of claim 17, wherein the receiver is used in an Orthogonal Frequency Division Multiplexing (OFDM) system.

19. The receiver of claim 18, wherein the OFDM system is operated in accordance with one of the Institute of Electrical and Electronics Engineering 802.11a and 802.11g standards.

20. The receiver of claim 18, wherein the system operates in the 4.9 GHz frequency spectrum.

* * * * *